US009008306B2

(12) United States Patent
Lecomte et al.

(10) Patent No.: US 9,008,306 B2
(45) Date of Patent: *Apr. 14, 2015

(54) ADAPTIVE AND PROGRESSIVE AUDIO STREAM SCRAMBLING

(75) Inventors: Daniel Lecomte, Paris (FR); Daniela Parayre-Mitzova, Paris (FR)

(73) Assignee: Querell Data Limited Liability Company, Dover, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/449,437

(22) Filed: Apr. 18, 2012

(65) Prior Publication Data

US 2012/0201384 A1   Aug. 9, 2012

Related U.S. Application Data

(60) Division of application No. 11/100,121, filed on Apr. 6, 2005, now Pat. No. 8,184,809, which is a continuation of application No. PCT/FR03/50099, filed on Oct. 21, 2003.

(30) Foreign Application Priority Data

Oct. 21, 2002 (FR) .................................. 02 13091

(51) Int. Cl.
*H04N 1/00* (2006.01)
*H04N 21/233* (2011.01)
*H04N 7/167* (2011.01)
*H04N 21/2347* (2011.01)
(Continued)

(52) U.S. Cl.
CPC ........... *H04N 21/233* (2013.01); *H04N 7/1675* (2013.01); *H04N 21/23476* (2013.01); *H04N 21/439* (2013.01); *H04N 21/631* (2013.01); *H04N 21/8106* (2013.01)

(58) Field of Classification Search
None
See application file for complete search history.

(56) References Cited

U.S. PATENT DOCUMENTS 5,331,670 A   7/1994   Sorbara et al.
5,703,887 A   12/1997  Heegard et al.
(Continued)

FOREIGN PATENT DOCUMENTS

EP   0920209 A1   6/1999
EP   0949815 A2   10/1999
(Continued)

OTHER PUBLICATIONS

Japanese Office Action issued in related Japanese Application No. 2004-546127 on Dec. 11, 2009 and its English language translation.
(Continued)

*Primary Examiner* — Edward Zee
*Assistant Examiner* — Leynna Truvan
(74) *Attorney, Agent, or Firm* — Pantich Schwarze Belisario & Nadel LLP

(57) ABSTRACT

A process for distributing digital audio sequences according to a nominal stream format that include a succession of frames, each of which includes at least one digital audio block grouping a plurality of coefficients corresponding to digitally coded audio elements, including modifying at least one block of an original stream of sequences, in an adaptive manner on the original stream as a function of at least a part of characteristics representative of the structure, content and parameters of the original stream, a target profile and external events.

8 Claims, 1 Drawing Sheet

(51) Int. Cl.
*H04N 21/439* (2011.01)
*H04N 21/63* (2011.01)
*H04N 21/81* (2011.01)

(56) References Cited

U.S. PATENT DOCUMENTS

| | | | |
|---|---|---|---|
| 5,852,664 | A | 12/1998 | Iverson et al. |
| 6,195,394 | B1 | 2/2001 | Arbeiter et al. |
| 6,215,820 | B1 | 4/2001 | Bagni et al. |
| 6,487,535 | B1 | 11/2002 | Smyth et al. |
| 6,597,961 | B1 | 7/2003 | Cooke |
| 6,654,421 | B2 | 11/2003 | Hanamura et al. |
| 6,674,477 | B1 | 1/2004 | Yamaguchi et al. |
| 6,957,350 | B1 | 10/2005 | Demos |
| 7,072,291 | B1 | 7/2006 | Jagadeesan et al. |
| 7,319,988 | B2 | 1/2008 | Schull |
| 7,492,955 | B2 | 2/2009 | Zandi et al. |
| 2002/0071556 | A1 | 6/2002 | Moskowitz et al. |
| 2002/0159457 | A1* | 10/2002 | Zhang et al. .................. 370/391 |
| 2003/0031251 | A1* | 2/2003 | Koto ........................ 375/240.03 |
| 2003/0044010 | A1* | 3/2003 | Hirano et al. ................. 380/201 |
| 2003/0131251 | A1* | 7/2003 | Fetkovich .................... 713/193 |
| 2007/0180534 | A1 | 8/2007 | Ishizaka et al. |

FOREIGN PATENT DOCUMENTS

| | | |
|---|---|---|
| JP | 5-145922 A | 6/1993 |
| JP | 07-303103 | 11/1995 |
| JP | 10-190646 A | 7/1998 |
| JP | 11-167616 A | 6/1999 |
| JP | 11243535 A | 9/1999 |
| JP | 2000090567 A | 3/2000 |
| JP | 2000-195161 A | 7/2000 |
| JP | 2000-286835 A | 10/2000 |
| JP | 2000-286837 A | 10/2000 |
| JP | 2000339852 A | 12/2000 |
| JP | 2001-197444 A | 7/2001 |
| JP | 2001-320363 A | 11/2001 |
| JP | 2002-108711 A | 4/2002 |
| JP | 2002-247547 A | 8/2002 |
| JP | 2002304805 A | 10/2002 |
| WO | WO-93/00769 A1 | 1/1993 |
| WO | WO-00/14967 A1 | 3/2000 |
| WO | WO-0154341 A2 | 7/2001 |
| WO | WO-01/80546 A2 | 10/2001 |
| WO | WO-02065448 A1 | 8/2002 |
| WO | WO-02/079906 A2 | 10/2002 |

OTHER PUBLICATIONS

Inquiry from the Japanese Patent Office, related Japanese Patent Application No. 2004-546127, dated Oct. 13, 2011.

English Translation of Inquiry from the Japanese Patent Office, related Japanese Patent Application No. 2004-546127, dated Oct. 13, 2011.

Japanese Office Action dated Mar. 18, 2014.

* cited by examiner

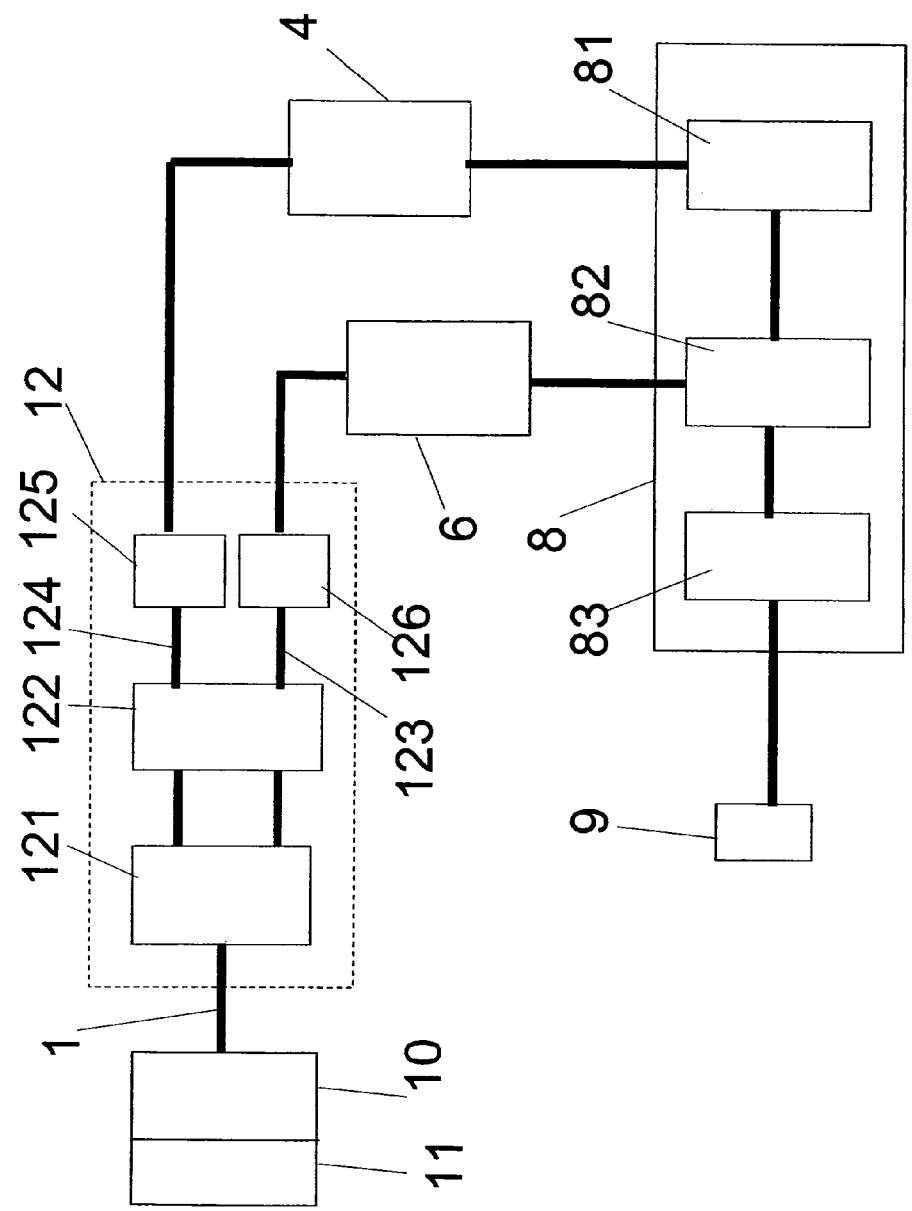

ADAPTIVE AND PROGRESSIVE AUDIO STREAM SCRAMBLING

RELATED APPLICATION

This is a divisional of U.S. patent application Ser. No. 11/100,121, filed Apr. 6, 2005, which is a continuation of International Application No. PCT/FR2003/050099, with an international filing date of Oct. 21, 2003 (WO 2004/039053, published May 6, 2004), which is based on French Patent Application No. 02/13091, filed Oct. 21, 2002.

FIELD OF THE INVENTION

This invention relates to processing digital audio streams. More particularly, the invention relates to a system permitting the auditory scrambling and recomposing of digital audio content.

BACKGROUND

WO 00/58963 (Liquid Audio) discloses that data such as a musical track is saved as a secure portable track (SPT) that can be linked to one or several players and can be linked to a particular saving means, thus restricting reading the SPT to specific players and ensuring that the reading is carried out only from the original saving means. The SPT is linked to a player by the encryption of data of the SPT using a save key that is unique to the player, difficult to change and is guarded by the player under strict security conditions. The SPT is linked to a particular means of saving including data uniquely identifying the save means in a form resistant to falsification, that is, signed in an encrypted manner.

A system for scrambling audio signals is also known from U.S. Pat. No. 4,600,941 (Sony) in which an audio signal is divided into blocks, each of which is formed by a plurality of frames, which plurality of frames is rearranged on a time base in an order predetermined for each block in such a manner as to be encoded. The encoded signal is rearranged on a time base in an original order in such a manner as to be decoded. This system comprises a first circuit for processing the signal to insert a redundant portion into a portion between contiguous frames and to compress the frames in base time in response to the redundant portions during the encoding, a circuit generating a signal for inserting a control signal other than audio information in the redundant portions, a circuit for detecting the control signal for detecting the control signal during decoding and a second circuit for processing the signal for removing the redundant portions in synchronism with the detected control signal and decompressing the frames in base time in response to the redundant portions.

A method and a system for scrambling and descrambling audio information signals is also known from U.S. Pat. No. 5,058,159 (Macrovision corporation). The audio signals are scrambled by inverting the original frequency spectrum in such a manner that the frequency portions that are originally at the bottom in the audio frequency band are shifted to the top, whereas the portions originally at the top of the band are shifted to the bottom. A pilot sound of a known frequency is recorded with the audio signals of the shifted frequencies. During reproduction, each variation in phase and in frequency is searched by its pilot that used to generate the modulation signal for reconstituting the original content in audio signal frequencies.

WO 99/55089 "Multimedia Adaptive Scrambling System" discloses a system for scrambling digital samples representing multimedia data (audio and video) in such a manner that the content of the samples is degraded, but recognizable or otherwise supplied with the required quality. The level of quality is linked to an associated signal/noise ratio and determined with the aid of objective and subjective tests. A given number of LSB's (least significant bits) is scrambled frame by frame in an adaptive manner as a function of the dynamics of the possible values. All the encryption keys are included in the audio/video stream and used by the decoder for descrambling and restoring the stream. After the descrambling the encryption key cannot be recovered because it is scrambled itself by the decoder.

The art provides evidence of a number of systems for protecting audio streams based substantially on the encryption of data, adding encryption keys independent of the content of the audio stream and which therefore modify the format of the structured stream. One particular and different realization is that of the Coding Technologies company, that consists protecting by scrambling a selected part of the bitstream ("bitstream" refers to the binary stream at the output of the audio encoder) and not the entire bitstream. The protected parts represent the spectral values of the audio signal with the result that during the decoding without decryption the audio stream is distorted and disagreeable to the ear.

SUMMARY OF THE INVENTION

This invention relates to a process for distributing digital audio sequences according to a nominal stream format that includes a succession of frames, each of which includes at least one digital audio block grouping a plurality of coefficients corresponding to digitally coded audio elements, including modifying at least one block of an original stream of sequences in an adaptive manner on the original stream as a function of at least a part of characteristics representative of the structure, content and parameters of the original stream, a target profile and external events.

This invention also relates to a system for distributing digital audio sequences including an audio server including means for broadcasting a stream modified in conformity with the process for distributing digital audio sequences and a plurality of pieces of equipment provided with a scrambling circuit, wherein the server includes means for recording the digital profile of each target and means for control of the modification means as a function of input variables corresponding to at least a part of the characteristics representative of the structure, the content and the parameters of the original audio stream, the target profile and the external events.

BRIEF DESCRIPTION OF THE DRAWING

The Drawing schematically shows a client system in accordance with aspects of the invention.

DETAILED DESCRIPTION

The invention addresses the disadvantages of the prior art by providing an adaptive and progressive scrambling as a function of the structure of the audio stream, of the client profile and of external events.

The invention thus relates to a device capable of transmitting in a secure manner a set of audio streams with a high auditory quality to a musical or speech player to be recorded in the memory or on the hard disk of a set-top decoder box connecting the transmission network to the audio player while preserving the auditory quality, but avoiding fraudulent use such as the possibility of making pirated copies of audio programs recorded in the memory or on the hard disk of the set-top decoder box.

The invention also relates a process for distributing digital audio sequences according to a nominal stream format constituted of a succession of frames, each comprising at least one digital audio block grouping a certain number of coefficients corresponding to simple audio elements coded digitally according to a manner specified in the stream concerned and used by all audio decoders capable of playing it to be able to correctly decode it. This process comprises:

a preparatory stage comprising modifying at least one of the coefficients, a transmission stage of a main stream in conformity with the nominal format constituted of frames containing the blocks modified in the course of the preparatory stage and by a path, separate from this main stream, of complementary digital information allowing the reconstitution of the original stream from the computation on the target equipment as a function of the main stream and of the complementary information. The complementary information is defined as a set constituted of data (e.g., coefficients describing the original data stream or extracts of the original stream) and of functions (e.g., the substitution or interchanging function). A function is defined as containing at least one instruction putting data and operators in a relationship. This complementary digital information describes the operations to be carried out for recovering the digital stream from the modified stream.

Reconstitution of the original stream is carried out on the target equipment from the modified main stream already present or sent in real time on the target equipment and from the complementary information sent in real time at the moment of listening and comprising data and functions executed with the aid of digital routines (set of instructions).

The term "scrambling" denotes modification of a digital audio stream by appropriate methods in such a manner that the stream remains in conformity with the norm or standard with which it was digitally encoded while rendering it audible by an audio reader (or player), but altered as concerns human auditory perception.

The term "descrambling" denotes the process of restoration by appropriate methods of the initial stream and the restored audio stream is identical after descrambling to the original initial audio stream. Reconstitution of the original stream is carried out on the target equipment from the modified main stream already present or sent in real time on the target equipment and from the complementary information sent in real time at the moment of listening and comprising data and functions executed with the aid of digital routines (set of instructions). The entirety or a subpart of the complementary information is sent as a function of the profile and of the rights of the client. The quantity of information contained in this subpart of the complementary information is defined as the number of data and/or functions belonging to the complementary information sent to the target during the connection.

The type of information contained in this subpart corresponds to a level of scalability determined as a function of the profile of the target. The nature of the data and/or functions belonging to the complementary information sent to the target during the connection is defined as the type. For example, the type of data is relative to the habits of the target (connection time, duration of the connection, regularity of the connection and of payments), to the environment (lives in a big city, the time at the present moment) and to personal characteristics (age, sex, religion, community).

Complementary information is composed at least of functions that are personalized for each target relative to the connection session. A session is defined starting from the connection time, the duration, the type of the modified stream listened to and the connected elements (targets, servers).

The complementary information is subdivided into at least two subparts, each of which can be distributed by different media or by the same medium. For example, in the case of distribution of the complementary information by several media a more complex management of the rights of the targets can be ensured.

The term "profile" of the user denotes a data file comprising descriptors and information specific to the user, e.g. cultural preferences and social and cultural characteristics, habits of use such as the frequency of using audio means, the average listening time of a scrambled audio sequence, the frequency of listening to a scrambled sequence, the price the user is ready to pay or any other behavioral characteristic regarding the use of audio sequences. This profile is formalized by a data file or a data table that can be used by computer means.

Many scrambling systems have an immediate effect in that the initial stream is totally scrambled or the initial stream is not scrambled at all. Also, generally different audio sequences can be scrambled with the same algorithm and the same regulating parameters. Numerous protections used do not change the scrambling of an audio stream as a function of its contents.

An adaptive and progressive scrambling is supplied as a function of the structure of the audio stream (bitstream) and/or of its contents while changing the algorithms and the parameters of the scrambling as a function of the characteristics of the audio stream and of the user application to realize reliable protection regarding deterioration of the original stream and resistance to pirating at a minimum cost and assuring the quality of service required by the target or the client. Various adaptations of scrambling are applied, e.g., like those cited below.

The invention concerns in its most general meaning a process for distributing digital audio sequences according to a nominal stream format that are constituted a succession of frames, each of which comprises at least one digital audio block grouping a plurality of coefficients corresponding to simple, digitally coded audio elements, which process comprises a stage for modification of at least one block of the original stream, characterized in that this modification stage acts in an adaptive manner on the original stream as a function of at least a part of the characteristics representative of the structure, the content and parameters of the original audio stream, the target profile and external events.

The modification stage preferably comprises replacing a part of the coefficients to produce on the one hand a main audio stream in nominal format and on the other hand complementary modification information that allows the reconstruction of the original stream by a decoder of the target equipment, the scope of which modifications is variable and determined by the representative characteristics.

The modified main stream may be recorded on the target equipment prior to the transmission of the complementary information on the target equipment. The modified main stream may also be recorded on a physical support to be transmitted to the target equipment prior to transmission of the complementary information on the target equipment. The modified main stream and the complementary information may be transmitted together in real time.

This complementary modification information advantageously comprises at least one digital routine suitable for executing a function. The complementary modification information may be subdivided into at least two subparts. The subparts of the complementary modification information may also be distributed by different media. The subparts of the complementary modification information may be distributed by the same media. The complementary information may further be transmitted on a physical vector. Finally, the complementary information may be transmitted online.

The digital audio sequences are advantageously modified in a differentiated manner as a function of their audio content. The digital audio sequences are advantageously modified in a differentiated manner as a function of the layer of modified scalability. The digital audio sequences are also advantageously modified in a differentiated manner as a function of the rate in kilobits per second (kbits/s) of the original stream.

The digital audio sequences may be modified in a differentiated manner as a function of the profile and the digital level defined by the norm or the standard with which they were encoded. The digital audio sequences may also be modified in a differentiated manner as a function of the number of audio channels present in the stream.

The digital audio sequences are advantageously modified in a differentiated manner as a function of coupling and multiplexing between different audio channels present in the stream. The digital audio sequences may be modified in a differentiated manner as a function of the sampling frequency with which the audio stream was encoded. The digital audio sequences may be modified in a differentiated manner as a function of the psychoacoustic model used. The digital audio sequences may further be modified in a differentiated manner as a function of their granular scalability.

The digital audio sequences are advantageously modified in a progressive manner increasing the degradation effect up to the complete scrambling of the audio stream. The digital audio sequences are preferably modified with a random generation of the scrambling parameters and configurations.

The process preferably comprises a prior analog/digital conversion stage with a structured format, which process is applied to an analog audio signal.

The invention also relates to a system for distributing digital audio sequences comprising an audio server comprising means for broadcasting a stream modified in conformity with any one of the preceding processes and a plurality of pieces of equipment provided with a scrambling circuit, characterized in that the server also comprises means for recording the digital profile of each target and means for controlling the modification means as a function of input variables corresponding to at least a part of the characteristics representative of the structure, the content and the parameters of the original audio stream, of the target profile and of external events.

A digital audio stream is generally composed by sequences comprising frames or blocks organized according to a digital format specific for each audio coder, including the headers of the frames with the various parameters of encoding and coefficients relative to a specific representation of digital audio samples. Given knowledge of the manner in which the modeling, compression and encoding of the audio signal for the audio coder and/or the given standard or the norm are carried out, it is possible to extract the main parameters from the bitstream that describe it and that are sent to the decoder.

Once these parameters are identified, they are modified in such a manner that the audio stream generated by the given coder and/or standard is in conformity with the coder and/or standard. Moreover, the modification ensures stability of the sound signal, but renders it unusable by the user, because it is scrambled. Nevertheless, it can be understood and interpreted in the decoder corresponding to its encoding and played by a player without the latter being disturbed.

Modification of one or several of the components of the audio signal (spectral envelope, fundamental or harmonics, psychoacoustic model, time division development, signal/noise ratio, composition, compression, quantification, transformation) cause its degradation from an auditory standpoint and transform it into a signal that is completely incomprehensible as concerns the subjective auditory perception. The part of the audio signal or the component describing it that will be modified depends on its encoding for each given coder-decoder regardless of whether for speech, music, sound or special effects, synthetic sounds or any audio signal of the same type. Depending on the manner in which encoding and transformation of the resulting parameters are realized, it is possible to have direct or indirect information about the main characteristics of the audio signal and thus modify them. This principle is applicable to all types of digital coders as well as to all their base and enhancement layers or the combination of both.

An adaptation of the scrambling parameters is applied as a function of the content of the audio stream: Natural or synthetic speech, music, noise, natural or synthetic or compound sounds, special effects. For example, the HVXC (harmonic vector eXcitation coding) encoder for speech and the HILN (harmonic and individual lines plus noise) for music, defined by the MPEG-4 norm, are parametric coders that code the audio signal separately or conjointly as a function of its content.

For example, in the case in which speech is predominant the bitstream coming from the HVXC contains the values of the LSP (line spectral pairs) reflecting the LPC (linear predictive coding) parameters. The values of the LSP of the current frame are quantified vectorially in two stages, stabilized in one value to ensure the stability of the LPC synthesis filter and then arranged in a bitstream in ascending order with a minimum distance between adjacent coefficients.

The subscripts of the vectorially quantified LSP pairs are transmitted to the decoder that restores the values of the LSP and therefore of the LPC from standard tables. By replacing the original subscripts with other values taken from predefined tables in the norm the bitstream will remain in conformity, but the decoded LSP values will not correspond to the original LPC parameters. As a consequence, the spectral envelope will be modified and the speech deteriorated.

Many audio coders are characterized by scalability. The notion of "scalabilite" is defined from the English word "scalability", which characterizes an encoder capable of encoding or a decoder capable of decoding an ordered set of binary streams in such a manner as to produce or reconstitute a multilayer sequence. A scrambling that is adaptive relative to the base layer or the enhancement layers is applied as a function of the configuration of the audio encoder. For example, the HVXC and HILN encoders each possess a base layer and an enhancement layer, which allows several possible configurations. The parameters for the base layer, the enhancement layer or for the two layers are modified as a function of the degree of scrambling desired.

An adaptation is also applied as a function of the rate in number of kilobits per second (kbits/s) of the audio stream whether it is constant or variable. For certain more complex audio streams (like those of the MPEG-4 type, that have a variable rate in very large proportions (from 2 kbits/s to 64 kbits/s), the scrambling parameters are selected as a function of the rate, given that the scrambling for a low rate on the order of 2 kbits/s turns out to be less effective for higher rates where the encoding precision is much greater.

An adaptation of the scrambling parameters is also applied as a function of the fine granular scalability, stemming from the English term "fine granular scalability" characterizing certain audio streams. The notion of "scalabilite granulaire" is defined from the expression in English "granular scalability" used in the MPEG-4 norm that characterizes an encoder capable of encoding or a decoder capable of decoding an ordered set of binary streams in such a manner as to produce or reconstitute a multi-layer sequence. Granularity is defined as the quantity of information that can be transmitted per layer of a system characterized by any scalability, which system is then also granular. For example, the AAC encoding scheme (advanced audio coding) with BSAC (bit sliced arithmetic coding) creates the possibility of an encoding with reduction of the noise of an AAC bitstream in a bitstream with a fine granular scalability between 16 kbits/s and 64 kbits/s per channel, of which the binary rate can be modulated with a step of 1 kbits/s.

For certain more complex audio streams (like those defined by the MPEG-4 norm) an adaptive scrambling is applied as a function of the types of objects contained in the stream, of the profile, level designating the complexity and the options used during construction of the audio stream. In fact, there are a multitude of objects and of audio profiles in the MPEG-4 audio framework. For example, for the natural audio objects, one of the profiles is the simple scalable one that contains the CELP (code excited linear prediction) tools and AAC (advanced audio coding). Scrambling is carried out as a function of the parameters of these two coders. Adaptive modification of the elements of the audio stream is carried out as a function of the types of audio objects that each profile and level contain. An adaptation of the scrambling parameters may also be applied as a function of the number of audio channels present in the stream. An adaptation of the scrambling parameters may be applied as a function of the coupling and of the multiplexing between the various audio channels present in the stream. An adaptation of the scrambling parameters may further be applied as a function of the sampling frequency with which the audio stream was encoded. An adaptation of the scrambling parameters may be applied as a function of psychoacoustic model used characterizing certain audio encoders.

For example, in the AAC MPEG-4 norm, the psychoacoustic model estimates the thresholds determining the maximum quantification error that can be admitted during compression while preserving the audio quality. The spectral data is quantified and coded as a function of these estimated thresholds. Quantification is selected as a function of the estimated thresholds, e.g., quantification can be uniform or non-uniform and it is carried out with the aid of scale factors. By modifying the values of these scale factors coded in differential in the binary stream, a quantification error is introduced because the scale factors no longer correspond to those defined by the estimations of the psychoacoustic model. Scrambling is adapted as a function of the desired auditory degradation. In a case in which a slight scrambling would be desired the last scale factors are modified. It is advantageous if a strong auditory degradation is desired that the first scale factor is modified. Given that all the scale factors are coded in differential relative to the first scale factor all the values that follow are erroneous and the audio signal is strongly disturbed.

A progressive scrambling is also applied in such a manner that the user begins to hear the non-scrambled audio stream. Then, a slight scrambling is begun that is reinforced more and more until the audio stream becomes entirely scrambled. The goal striven for is to awaken the interest of the user for the audio stream, but to remove the rights to hear it if the user did not purchase them. A realization of this application is to scramble the audio stream with one or several of the given algorithms while progressively modifying the scrambling parameters during a time determined in such a manner as to increase the unpleasantness until arriving at a completely scrambled and inaudible stream.

An adaptive scrambling is generally realized as a function of the content, characteristics, structure and composition of the digital stream defined by a norm or a given standard. Scrambling is also realized with a random generation of parametric combinations to be applied to scramble the audio stream. A protection that is robust and difficult to attack or that can not be pirated by an ill-disposed person is ensured in this manner.

An adaptation of the scrambling parameters and algorithms is also applied as a function of the target profile, as a function of the target behavior during the connection to the server (e.g., the regularity and submission of payments), as a function of the price that be paid, as a function of habits (e.g., time, time of connection), as a function of characteristics (e.g., age, sex, religion, community), or as a function of data communicated by a third party (belonging to associations or present in consumer databases).

An adaptation of the scrambling parameters and algorithms is also applied as a function of external events as, e.g., the broadcasting time, audience rate, sociopolitical events or disturbances during the broadcasting.

The invention will be better understood with the aid of the following description made purely by way of explanation of a selected aspect of the invention with reference made to the drawing which shows a particular agent of the client-server system in accordance with the invention. The audio stream of the MPEG-AAC type that is to be secured 1 is sent to an analyzing 121 and scrambling 122 system that generates a modified main stream and complementary information at the output.

The original stream 1 can be directly in digital form 10 or in analog form 11. In the latter case, analog stream 11 is converted by a coder (not shown) in digital format 10. In the remainder of the text we will take note 1 of the input digital audio stream.

A first stream 124 in the MPEG-AAC format with a format identical to the input digital stream 1 except for the fact that some of its coefficients and/or values have been modified, is placed in an output buffer memory 125.

The complementary information 123 in any format contains the references to the parts of the audio samples that are modified and is placed in buffer 126. The analysis 121 and scrambling 122 system decides as a function of the characteristics of input stream 1 which adaptive scrambling to apply and which parameters of the stream to modify and also, as a function of the rights of the client, in which manner to apply the modifications, e.g., progressively or not.

The MPEG-AAC stream 125 is then transmitted either in physical form on a CD-ROM, non-volatile memory, DVD, or the like or via a network 4 of the telephone network type, DSL (digital subscriber line), BLR (local radio loop), DAB (digital audio broadcasting), RTC (commutated telephone network), digital mobiles (GSM, GPRS, UMTS), microwave, cable, satellite, e.g., to the client 8 and more precisely into memory 81 of the RAM, ROM, hard disk type. When target 8 requests to hear an audio sequence present in memory 81, there are two possibilities:

Either the target 8 does not have the rights necessary to play the audio sequence. In this case, stream 125 generated by the scrambling system 122 present in memory 81 is passed to synthesis system 82 that does not modify it and transmits it identically to a classic audio player 83 and its contents, heavily degraded auditorily, is played by player 83 on a headset or on loudspeakers 9, or Target 8 has the rights to hear the audio sequence. Server 12 transmits appropriate complementary information 126 as a function of the rights of the target by connection 6 corresponding to the type of scrambling carried out. In this case, the synthesis system makes a hearing request to server 12 containing the information 126 necessary to recover original audio sequence 1. Server 12 then sends complementary information 126 by connection 6 via transmission networks of the following types: analog or digital telephone line, DSL (digital subscriber line), BLR (local radio loop), DAB (digital audio broadcasting), RTC (commutated telephone network), digital mobile networks (GSM, GPRS, UMTS), microwave, cable or satellite which information permits the reconstitution of the audio sequence in such a manner that the target 8 can hear and/or store the audio sequence. Synthesis system 82 then proceeds to descramble the audio sequence by reconstructing the original stream by combining modified main stream 125 and complementary information 126. The audio stream obtained in this manner at the output of synthesis system 82 is then transmitted to classic audio player 83 and the original audio sequences played on a headset or loudspeakers 9.

The invention will now be described with the aid of a second exemplary aspect showing modifications differentiated as a function of the rate, structure, composition of the audio frame and also as a function of the effect of the auditory degradation to be obtained.

More and more coders have the option of functioning with variable rates to satisfy specific applications as, e.g., to respond to the constraints of limited bandwidth. An example of a coder designed to ensure an acceptable quality of speech while respecting a bandwidth with a low rate is the AMR ("adaptive multi-rate" in English) coder, designed for cellular telephony that can function in eight different modes and whose rate varies between 4.75 kbits/s and 12.2 kbits/s. The invention carries out modifications differentiated as a function of the mode with which the audio stream was encoded, that is, as a function of the rate, of the length of the prospective components of the frame as well as a function of the desired degree of auditory degradation.

For example, in the 12.2 kbits/s mode the structure of the AMR frame is the following:

The subscripts corresponding to the spectral frequency pairs, called LSF's ("line spectral frequencies"), relative to the LSP's ("line spectral pairs") parameters, therefore also to the LPC ("linear predictive coding"), that is, to the form of the filter of the formants, which subscripts are common to the entire frame;

Four groups of parameters relative to four subframes contained in the complete frame and representing one hundred and sixty audio samples.

Each group of parameters per subframe is constituted in the following manner:

Delay of the fundamental ("pitch delay"),

Amplitude of the fundamental ("pitch gain"),

Data concerning the sign and the frequency position of the excitation impulses,

Subscript relative to the gain of the table of values ("codebook").

These parameters are modified in a differentiated manner as a function of the desired auditory degradation. For example, modifying the value of the delay of the fundamental by substitution with a different value causes a frequency offset: A lower value causes a deformation of the voice and the effect obtained is a muffled sound with cracklings similar to an "extinction of the voice". Modifying the amplitude of the fundamental by substituting it with a larger value causes a jerky deformation, some parts are amplified and others "smothered".

Several modifications also carried out on the values of the LSF's:

Substituting the values of the LSF's by fixed values produces a known sound effect similar to a jammed radio channel;

Substituting the values of the LSF's by randomly changing the subscripts entirely breaks the sound because this adds cracklings of different frequencies and amplitudes producing a very unpleasant sound and the speech becomes unintelligible;

By modifying one LSF the audible degradation is similar to a noise of a "whistling" type, but a part of the sound remains perceptible. In this case, modifications are adapted, e.g., for pre-hearing applications ("teasing") when it is desired that the user can perceive the sound and choose to request the rights for it or not. For example, an LSF is modified and modifications are progressively added on the second LSF, the third, the fourth and the fifth until the values of all the LSF's have been modified by substituting the value of the subscripts with one and the same value, for example. The result obtained in this case is the concentration of the spectrum around a frequency, e.g., if the subscripts are placed at one, an unintelligible, low-frequency sound is obtained.

The differentiated modifications of the LSF's yield low-volume complementary information for a significant auditory degradation. They are preferably combined with other modifications.

The signs of the pulsations relative to the construction of the excitation are advantageously modified. Furthermore, by substituting the position of the pulsations with "false" positions, the excitation is also modified and the sound is totally deformed.

For a 7.95 kbits/s mode the structure of the frame is similar except that it contains a single set of three LSF's. Differentiated modifications are then applied taking this particularity into account and the frame length corresponding to this mode.

For the other modes of the AMR coder the frame structure is slightly different. It does not contain the amplitude of the fundamental nor the gain of the fixed value tables, but rather a set of gains relative to the fixed and adaptive value tables used for scaling the excitation constructed from the addition of the adaptive code-vectors and from innovation. The modification supplied take account of these specificities. Modifying the LSF's produces a significant degradation; however, given that the audio rates are not very elevated, small modifications are sufficient for obtaining a strong auditory degradation.

The differentiated modifications are preferably carried out taking account of the rate desired for the complementary information.

The invention is not limited to the selected aspects cited as exemplary embodiments, which modifications guarantee that the authorized amplitude values of the sound are not exceeded and guarantee the conformity of the modified main stream with the original audio stream.

It is advantageous if, after reconstitution on the equipment of the user from the modified main stream and from the complementary information, the reconstituted stream is auditorily identical to the original, but different from a binary standpoint from the original stream to reinforce the security.

It is advantageous if, after reconstitution on the equipment of the user from the modified main stream and from the complementary information, the reconstituted stream is strictly identical to the original and the process is without loss.

The invention claimed is:

1. A process for transmitting audio, comprising:
distributing a data stream containing an audio segment;
converting the data stream into a modified stream and complementary information, comprising:
first forming the modified stream by replacing original coefficients within the data stream with different coefficients in the same format as the original coefficients, such that the modified stream has the same format as the data stream, but no longer accurately represents the audio segment; and
second forming the complementary information to include at least the original coefficients that were replaced in the first forming and the original locations of the original coefficients in the data stream; and
sending the modified stream and the complementary information to a remote location;
wherein the first forming progressively degrades accuracy of the modified stream relative to the audio segment from a beginning of the audio segment to an end, such that the beginning of the modified stream when played is identical or substantially identical to the audio segment and a distortion of the modified stream relative to the audio segment becomes increasingly pronounced as the audio segment is played; and
wherein the complementary information contains sufficient information to reconstitute the data stream from the modified stream at the remote location.

2. A system for transmitting audio, comprising:
a storage device;
a server configured to distribute a data stream containing an audio segment from the storage device;
the server being further configured to convert the data stream into a modified stream and complementary information by:
first forming the modified stream by replacing original coefficients with the data stream with different coefficients in the same format as the original coefficients, such that the modified stream has the same format as the data stream, but no longer accurately represents the audio segment; and
second forming the complementary information to include at least the original coefficients that were replaced in the first forming and the original locations of the original coefficients in the data stream; and
the server being further configured to send the modified stream and the complementary information to a remote location;
wherein the first forming progressively degrades accuracy of the modified stream relative to the audio segment from a beginning of the audio segment to the end, such that the beginning of the modified stream when played is identical or substantially identical to the audio segment and the distortion of the modified stream relative to the audio segment becomes increasingly pronounced as the audio segment is played; and
wherein the complementary information contains sufficient information to reconstitute the data stream from the modified stream at the remote location.

3. A non-transitory computer-readable medium having stored thereon computer executable instructions that, in response to execution on an apparatus, cause the apparatus to perform operations comprising:
distributing a data stream containing an audio segment;
converting the data stream into a modified stream and complementary information, comprising:
first forming the modified stream by replacing original coefficients within the data stream with different coefficients in the same format as the original coefficients, such that the modified stream has the same format as the data stream, but no longer accurately represents the audio segment; and
second forming the complementary information to include at least the original coefficients that were replaced in the first forming and the original locations of the original coefficients in the data stream; and
sending the modified stream and the complementary information to a remote location;
wherein the first forming progressively degrades accuracy of the modified stream relative to the audio segment from a beginning of the audio segment to an end, such that the beginning of the modified stream when played is identical or substantially identical to the audio segment and a distortion of the modified stream relative to the audio segment becomes increasingly pronounced as the audio segment is played; and
wherein the complementary information contains sufficient information to reconstitute the data stream from the modified stream at the remote location.

4. A system for transmitting audio, comprising:
means for distributing a data stream containing an audio segment;
means for converting the data stream into a modified stream and complementary information, comprising
first means for forming the modified stream by replacing original coefficients within the data stream with different coefficients in the same format as the original coefficients, such that the modified stream has the same format as the data stream, but no longer accurately represents the audio segment; and
second means for forming the complementary information to include at least the original coefficients that were replaced in the first forming and the original locations of the original coefficients in the data stream; and
means for sending the modified stream and the complementary information to a remote location;
wherein the first forming progressively degrades accuracy of the modified stream relative to the audio segment from a beginning of the audio segment to an end, such that the beginning of the modified stream when played is identical or substantially identical to the audio segment and a distortion of the modified stream relative to the audio segment becomes increasingly pronounced as the audio segment is played; and
wherein the complementary information contains sufficient information to reconstitute the data stream from the modified stream at the remote location.

5. The method of claim 1, further comprising:
preserving, after the second forming, the complementary information.

6. The system of claim 2, wherein the server is configured to preserve, after the second forming, the complementary information.

7. The medium of claim 3, wherein the apparatus is configured to perform operations comprising preserving, after the second forming, the complementary information.

8. The system of claim 4, further comprising:
means for preserving, after the second forming, the complementary information.

* * * * *